Feb. 20, 1945.  J. E. DIETZGEN  2,369,819

SLIDE RULE

Filed Oct. 30, 1943

INVENTOR.
JOSEPH E. DIETZGEN

BY
Spencer, Marzall, Johnston & Cook,
attys.

Patented Feb. 20, 1945

2,369,819

UNITED STATES PATENT OFFICE 2,369,819

SLIDE RULE

Joseph E. Dietzgen, Winnetka, Ill., assignor to Eugene Dietzgen Co., Chicago, Ill., a corporation of Delaware Application October 30, 1943, Serial No. 508,327

3 Claims. (Cl. 235—70)

The present invention relates to slide rules in which a plurality of members are arranged for movement in relation to each other, and particularly to slide rules in which members have scales graduated in accordance with the logarithms of logarithms of numbers greater than unity and the logarithms of co-logarithms of numbers less than unity.

Various types of slide rules embodying such scales have been used. Those types are exemplified or mentioned in United States Letters Patent No. 2,283,473 issued May 19, 1942, to Tyler et al., No. 2,170,144 issued August 22, 1939, to Kells et al., No. 2,168,056 issued August 1, 1939, to Bernegau, and No. 2,079,464 issued May 4, 1937, to Okura. The use of slide rules of those types has been attended by numerous difficulties including confusion in the selection of scales due to the employment of an excessive number of different indices and the necessity of making frequent mechanical manipulations. An attempted improvement consisting in the employment of a single "log log" scale has the further disadvantage of greatly exceeding the standard size of ten inches in any readable and accurate construction. Experience has shown that slide rules which exceed that size are cumbersome and generally impractical.

An important object of the present invention is to provide a novel arrangement of scales graduated in accordance with the logarithms of logarithms of numbers greater than unity and the logarithms of co-logarithms of numbers less than unity in association with the ordinary logarithmic scales in a slide rule of conventional size avoiding excessive mechanical manipulations and the confusion incident to the employment of a variety of indices so that problems may be more simply, more quickly and more conveniently solved.

Another object of the invention is to provide a slide rule in which all "log log" scales are arranged on the same face of the slide rule in association with the same ordinary logarithmic scale, namely, the well known "A" and "B" scale of logarithms of numbers from 1 to 10, and the number of indices of that scale is reduced, making possible the reading of such values as $2.5^{2.4}$, $2.5^{-2.4}$, $2.5^{.5}$, $2.5^{-.5}$, $2.5^{3}$, $2.5^{-3}$, in a single setting of the slide without confusion in the selection of indices of the A and B scale and without reversing the slide rule. In slide rules of the prior art to solve such a problem it was necessary either to make numerous manipulations of the slide member and reverse the slide rule or ponder which of five indices, readable with difficulty, one should choose to obtain a solution.

This invention further resides in the combination, construction and arrangement of parts illustrated in the accompanying drawing, and while there is shown therein preferred embodiments of the invention, it is to be understood that the same are susceptible of modification and change without departing from the spirit of the invention.

The accompanying drawing illustrates a selected embodiment of the invention, and the views therein are as follows.

Figure 1:
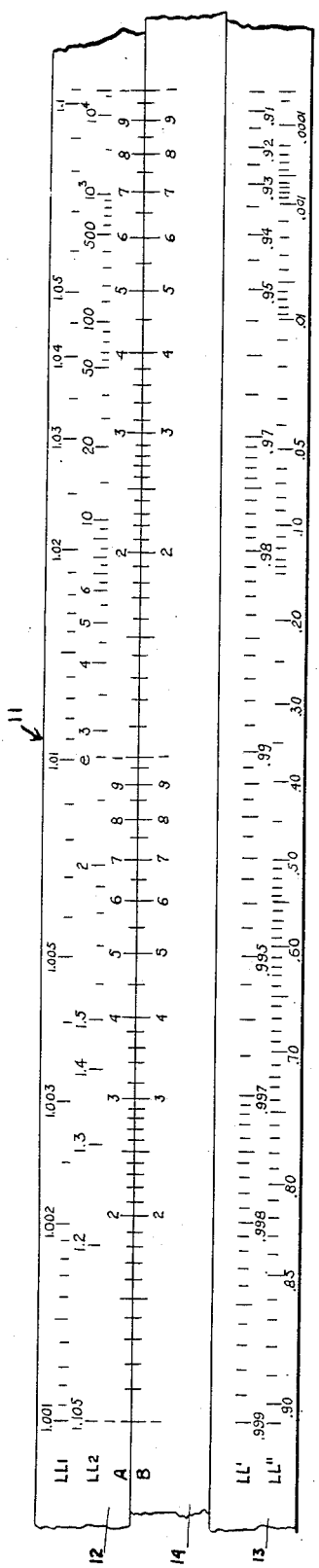
Fig. 1 is a plan view of a slide rule embodying the present invention with minor graduations omitted, the end portions of the rule being broken away, and minor graduations and the indicator being omitted.
Figure 2:
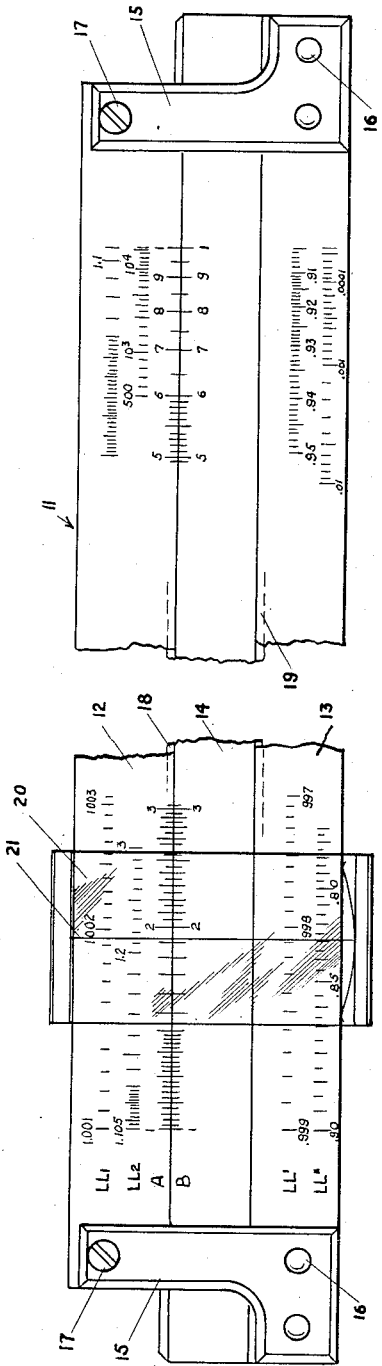
Fig. 2 is a plan view of a scale similar to that of Fig. 1 showing the end portions of the rule and indicator together with typical minor graduations, the mid portion of the rule being broken away.

Referring to the drawing, the numeral 11 indicates generally a slide rule of standard ten inch base length. The slide rule 11 comprises spaced, upper and lower, longitudinally extending members, designated by the numerals 12 and 13, respectively, and an intermediate slide member 14. For convenience of manipulation, the upper member 12 is preferably shorter in length than the other members 13 and 14. The members 12 and 13 are secured in spaced relation by means of plates 15 disposed adjacent their opposite ends. For convenience of adjustment and replacement, the plates 15 are preferably riveted to one of the members as shown at 16 and secured to the other member by means of screws 17. The slide member 14 is slidable in relation to the members 12 and 13 through a tongue and groove arrangement, tongues 18 provided on opposite edges of the slide member 14 being slidably received in corresponding grooves 19 provided in opposed edges of the members 12 and 13. An indicator of conventional type, comprising a transparent plate 20 with a hair line 21 thereon is mounted on the face of the rule for movement therealong. It will be readily understood that the members 12 and 13 when secured together form a structure which may be formed integrally, if desired.

On the member 12 along the outer edge of the member there is a scale "LL1" graduated in accordance with the logarithms of logarithms of numbers greater than unity in ascending order from one end of the scale toward the other, or left to right, from 1.001 to approximately 1.1, that is, from $e^{.001}$ to $e^{.1}$. Immediately below the scale LL1 is a scale "LL2" graduated in accordance with the logarithms of logarithms of numbers greater than unity, in ascending order from left to right, from approximately 1.1 to approximately 22000, or from $e^{.1}$ to $e^{10}$. The scales LL1 and LL2 read sequentially to form a single log log scale from $e^{.001}$ to $e^{10}$.

Along the inner edge of the member 12 and immediately below the scale LL2 is scale "A," the ordinary logarithmic scale A of numbers reading left to right from 1 to 10 and repeated once longitudinally of the member. This arrangement provides a middle index which is aligned with the e point of the LL2 scale when the slide member is in "zero" position, that is, when the initial indices of the several scales are in alignment.

Along the upper edge of the slide member 14 there is a scale "B" corresponding to the scale A and repeated once in like arrangement.

At the bottom edge of the member 13 there is a scale LL″ graduated in accordance with the logarithms of co-logarithms of numbers less than unity, in ascending order from right to left from approximately .0001 to approximately .905. Immediately above the scale LL″ is a scale LL′ graduated in accordance with the logarithms of co-logarithms of numbers less than unity in ascending order from right to left, from approximately .905 to approximately .999. The scales LL′ and LL″ read sequentially to form a continuous scale of the logarithms of the co-logarithms of numbers less than unity from $e^{-10}$ to $e^{-.001}$.

Additional scales such as C and D scales, tangent and sine scales, or other scales as desired, may be provided on the slide member 14 and the adjacent edge of the member 13 and on the reverse faces of the members 12, 13 and 14.

For convenience of operation, the scales of the present invention are preferably arranged over a space approximately ten inches in length, a standard length, which has proven most satisfactory in the use of slide rules. The several scales are graduated to the same basic unit length, namely, one-half the over-all length between terminal indices or approximately five inches.

The following examples illustrate the operation of the novel slide rule of the present invention:

*Example 1.*—Evaluate:

$$2.5^{2.4},\ 2.5^{-2.4},\ 2.5^{.5},\ 2.5^{-.5},\ 2.5^{3},\ 2.5^{-3}$$

Move hair line to 2.5 on LL2, draw center index of B under hair line, move hair line to 2.4 on B (to the right).

Read at hair line on LL2 $2.5^{2.4}=9.02$

Read at hair line on LL″ $2.5^{-2.4}=.111$ $2.5^{.5}$

Leave slide rule setting but move hair line to .5 on B (to the left).

Read at hair line on LL2 $2.5^{.5}=1.58$

Read at hair line on LL″ $2.5^{-.5}=.633$ $2.5^{3}$

Move hair line to 3 on B (to the right of center index).

Read at hair line on LL2 $2.5^{3}=15.6$

Read at hair line on LL″ $2.5^{-3}=.064$

*Example 2.*—Find the hyperbolic cosine of an angle $x$. This may be expressed in the equation $$\cosh x = \frac{e^{x}+e^{-x}}{2}$$

Let $x$ equal 2.5.

$e^{2.5}=12.18$ (push hair line to 2.5 on A scale—slightly to the right of the middle index, read under hair line 12.18 on LL2).

$e^{-2.5}=.08$ (read .08 on LL′ under hair line)

$\cosh x = (12.18+.08)\ \tfrac{1}{2}=6.13$

The foregoing illustrative examples are but a few of many solutions of problems involving the use of logarithms of logarithms of numbers greater than unity and logarithms of co-logarithms of numbers less than unity in association with the ordinary A and B scale which may be performed on the novel slide rule of the present invention with a single setting of the slide member and on one face of the rule in contrast with the more involved procedure attending the use of slide rules of the prior art requiring complicated manipulations of the slide member and reversal of the rule.

Changes may be made in the form, construction and arrangement of the parts without departing from the spirit of the invention, and the right is hereby reserved to make all such changes as fairly fall within the scope of the following claims.

The invention is hereby claimed as follows:

1. A slide rule comprising a frame and a slide member relatively movable with respect to said frame, said frame carrying a double line scale graduated in accordance with the logarithms of logarithms of numbers greater than unity from $e^{.001}$ to $e^{10}$, arranged in ascending order from one end of the rule toward the other, and in one line from the lowest number of the scale to a point midway of the scale and in another line from said midway point to the highest number of the scale, another double line scale graduated on said frame in accordance with the logarithms of co-logarithms of numbers less than unity from $e^{-10}$ to $e^{-.001}$ arranged in ascending order from one end of the rule toward the other in a direction opposite to said first named double line scale, and in one line from the lowest number of the scale to a point midway of the scale and in another line from said midway point to the highest number of the scale, said slide member having a single line scale graduated in accordance with the logarithms of numbers arranged in ascending order from one end of the rule toward the other in the same direction as the first mentioned double line scale, said scale of logarithms of numbers being repeated once to provide two such scales and one index between the ends thereof, said scales being graduated to the same unit length and on the same face of said rule, and said index being aligned with the e point of said double line scale on said first named member when the rule is in zero position.

2. A slide rule comprising a frame and a slide member relatively movable with respect to said frame, said frame having a single line scale graduated in accordance with the logarithms of logarithms of numbers greater than unity from $e^{.001}$ to $e^{.1}$, a second single line scale graduated in accordance with the logarithms of logarithms of numbers greater than unity from $e^{.1}$ to $e^{10}$, and a third single line scale graduated in accordance with the logarithms of numbers from 1 to 10 repeated once to provide two such scales and one index between the ends thereof, each of said scales being arranged in ascending order from one end of the rule toward the other in the same direction; an additional single line scale graduated on said frame in accordance with the logarithms of co-logarithms of numbers less than unity from $e^{-10}$ to $e^{-.1}$, and another single line scale graduated in accordance with the logarithms of co-logarithms of numbers less than unity from $e^{-.1}$ to $e^{-.001}$, said last two mentioned scales being arranged in ascending order from one end of the rule toward the other in a direction opposite to said first mentioned scales; and said slide member having a single line scale graduated in accordance with the logarithms of numbers from 1 to 10 arranged in ascending order from one end of the rule toward the other and repeated once to provide two such scales and one index between the ends thereof; all said scales being on the same face of the rule and co-extensive in the zero position of said rule, and said indices being aligned with each other and with the $e$ point on said first named member when the rule is in zero position.

3. A slide rule comprising members relatively movable with respect to each other, one of said members having thereon a scale graduated in accordance with the logarithms of logarithms of numbers greater than unity from $e^{.001}$ to $e^{10}$ arranged in two substantially equal divisions, each division being arranged in a single line and in ascending order from one end of the rule toward the other, and a scale graduated in accordance with the logarithms of co-logarithms of numbers less than unity from $e^{-10}$ to $e^{-.001}$ arranged in ascending order from one end of the rule toward the other in a direction opposite to that of said first named scale, and the other of said members having a single line scale graduated in accordance with the logarithms of numbers arranged in ascending order from one end of the rule toward the other in the same direction as said first named scale, said scale of logarithms of numbers being repeated once to provide two such scales in the same line and one index intermediate the ends thereof, said scales being substantially co-extensive when the members are in one position relative to each other, and all said scales being on the same face of the rule and graduated and arranged to cooperate, one with another, in the solution of problems.

JOSEPH E. DIETZGEN